United States Patent [19]
Fritze

[11] 3,755,268
[45] Aug. 28, 1973

[54] THIOLACTONE POLYMERIZATION AND CATALYSTS

[75] Inventor: Peter E. Fritze, West Millington, N.J.

[73] Assignee: Union Carbide Corporation, New York, N.Y.

[22] Filed: June 16, 1972

[21] Appl. No.: 263,598

[52] U.S. Cl........... 260/79, 252/431 C, 260/31.2 R, 260/78.3 R, 260/890
[51] Int. Cl............................................. C08g 23/00
[58] Field of Search......................... 260/79, 78.3 R; 252/431 C

[56] References Cited
UNITED STATES PATENTS

| | | | |
|---|---|---|---|
| 2,962,524 | 11/1960 | Hostetter et al. | 260/78.3 R |
| 3,257,356 | 6/1966 | Gervasi | 260/78.3 R |
| 3,663,515 | 5/1972 | Hostetter et al. | 260/78.3 R |
| 3,367,921 | 2/1968 | Sweeny et al. | 260/79 |

*Primary Examiner*—Donald E. Czaja
*Assistant Examiner*—Melvyn I. Marquis
*Attorney*—Paul A. Rose, Bernard F. Crowe et al.

[57] ABSTRACT

Thiolactones can be polymerized using as a catalyst, manganous or cadmium ions, in conjunction with an initiator such as water or an organic compound containing a primary hydroxyl or sulfhydryl group. They can also be copolymerized with lactones using the same catalyst/initiator system.

18 Claims, No Drawings

THIOLACTONE POLYMERIZATION AND CATALYSTS

BACKGROUND OF THE INVENTION

This invention pertains to the polymerization of thiolactones alone or with lactones and in particular to manganous or cadmium catalysts used for this purpose.

While the anionic polymerization of epsilonthiocaprolactone is known, this tenchnique is generally unacceptable for commercial production of poly(epsilonthiocaprolactone). Large scale anionically initiated polymerization of epsilon-thiocaprolactone cannot be carried out in bulk, because the polymerization rate is too fast to be controlled. This type of uncontrolled exothermic polymerization, in addition to being dangerous, also leads to decomposed products. It is necessary then for large scale anionically initiated polymerizations of epsilon-thiocaprolactone to be carried out in solvents. This technique necessitates the use of precipitating solvents or solvent stripping steps and tedious and expensive solvent recovery steps It is therefore an object of this invention to provide a catalyst system which effects the bulk polymerization of thiolactones alone or in conjunction with lactones.

Unfortunately, the discovery of such a catalyst system requires more than the extension of catalysts used successfully in the polymerization of thiolactone analogs, such as epsilon-caprolactone. Thus, for example, such catalysts as stannous octanoate with glycol initiators, which serve admirably for the bulk polymerization of epsilon-caprolactone, are ineffective as catalysts for the bulk polymerization of epsilon-thiocaprolactone.

SUMMARY OF THE INVENTION

A satisfactory catalyst system for the polymerization of thiolactones has been developed consisting essentially of a catalytic amount of metallic ion selected from the group consisting of manganous ions and cadmium ions in combination with at least about 0.1 mole percent, based on the moles of thiolactone, of an initiator selected from the group consisting of water, primary alcohols, and primary mercaptans.

DESCRIPTION OF THE INVENTION

The manganous or cadmium ions can be conveniently provided as manganous or cadmium salts. The preferred salts are carboxylic acids containing from 1 to 18 carbon atoms. These carboxylic acids can be aliphatic, cycloaliphatic, or aromatic acids. It is also preferred that the solubility of the manganous or cadmium salts in the thiolactone monomer to be polymerized be sufficient to provide concentrations of from about 0.01 percent to about 1.0 percent weight percent of manganous or cadmium ions in said monomer, particularly at temperatures of about 120°C. to about 200°C.

Preferred aliphatic acid salts include those made from formic acid, acetic acid, propionic acid, butyric acid, valeric acid, caproic acid, caprylic acid, capric acid, and the like.

Preferred manganous or cadmium cycloaliphatic acid salts include those prepared from cyclopentane carboxylic acid, cyclopentylacetic acid, 3-methylcyclopentylacetic acid, cyclohexanecarboxylic acid, 4-methylcyclohexane carboxylic acid, and the like.

Preferred manganous or cadmium aromatic acid salts include those made from benzoic acid, o-toluic acid, m-toluic acid, p-toluic acid, anisic acid, alphanaphthoic acid, beta-naphthoic acid, diphenic acid, and the like.

Particularly preferred specific salts are manganous benzoate and cadmium caprylate.

A wide variety of primary alcohols and primary mercaptans function as initiators in this catalyst system since it is the -CH$_2$OH or -CH$_2$SH functionality which is critical not the moiety to which one or more of these groups is appended. Thus while secondary or tertiary alcohols and secondary or tertiary mercaptans cannot be used, the range of useful primary alcohols and primary mercaptans extends from monohydric to polyhydric primary alcohols and mercaptans and even to complex polymeric compounds where the appended -CH$_2$OH or -CH$_2$SH functionalities constitute only a small percent of the total molecule. For example, at one end of the spectrum one can use monohydric primary alcohols such methanol, ethanol, n-propanol, n-butanol, n-pentanol, n-hexanol, and the like; polyhydric primary alcohols such as ethylene glycol, 1,3-propanediol, 1,4-butanediol, 1,5-pentanediol, 1,6-hexanediol, pentaerythritol, diethylene glycol, triethylene glycol and the like; and primary mercaptans, such as, ethyl mercaptan, octyl mercaptan, dodecyl mercaptan, decylene dimercaptan, and the like. At an intermediate point in the spectrum one can use polyether glycols having molecular weights of about 600 to 6,000 commercially produced by the condensation of an alkylene oxide, such as, ethylene oxide, with an alkylene glycol. At the upper end of the spectrum one can use addition or condensation polymers having pendant primary hydroxyl or sulfhydryl groups thereon. For example an hydroxy alkyl acrylate can be homopolymerized or copolymerized with other ethylenically unsaturated monomers to provide a high polymer which also functions as the initiator in this catalyst system.

While the lower limit of initiator is about 0.1 mole percent, based on the moles of thiolactone used, there is no absolute upper limit. Where high molecular weight polythiolactones are the desired end it is preferred to keep the concentration of initiator low. However useful polythiolactones can be produced where the concentration of initiator is 1.0 moles and even higher. Higher initiator concentrations may be desired where the molecular weight of the initiator itself is high and the ratio of primary hydroxyl or sylfhydryl groups to the total initiator is low.

The thiolactones which can be polymerized by the catalysts of this invention have the formula:

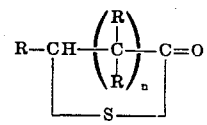

wherein $n$ is an integer having values of from about 3 to about 6, wherein at least $n$ + two R's are hydrogen and wherein the remaining R's are lower alkyl groups having up to about 8 carbon atoms. Unsubstituted epsilon-thiocaprolactone a known compound, which can be prepared by the cyclization of 6-mercaptohexanoic acid, has been disclosed by C.G. Overberger and J.K. Weise in the Journal of the American Society, Vol. 90, page 3,533–3,537 (1968).

This catalyst system can also be used for the copolymerization of thiolactones with lactones. The latter class may be delineated by the formula:

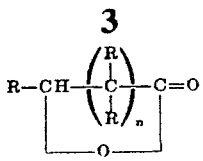

wherein n and R are as defined above.

Among the preferred lactones suitable as comonomers in this invention are the various monoalkyl epsilon-caprolactones such as monomethyl-, monoethyl-, monopropyl-, monoisopropyl-, and the like; dialkyl epsilon-caprolactones in which the two alkyl groups are substituted on the same or different carbon atoms, but not both on the epsilon-carbon atoms and trialkyl epsilon-caprolactones in which two or three carbon atoms in the lactone ring are substituted, so long as the epsilon carbon atom is not substituted. Other lactones including delta-valero lactone, eta-enatholactone and eta-caprylolactone may also be used as the lactones in this invention.

As a further extension, this catalyst system can effect the grafting of thiolactones onto addition or condensation polymers containing primary hydroxyl or sulfhydryl groups.

Homopolymers of thiolactones as well as copolymers of thiolactones with lactones and other comonomers can be used as noncrystallizing, permanent plasticizers for vinyl chloride resins, dye assists and molding materials.

In effecting homopolymerization of thiolactone monomers or their copolymerization with about 1 to about 99 percent by weight of lactone monomer based on the total weight of thiolactone monomer, it is preferred to contact the monomer or monomers in bulk with about 0.01 to about 1 percent weight percent, based on the weight of monomer or monomers charged, of manganous or cadmium ions in combination with at least about 0.1 mole percent, based on the moles of monomer or monomers charged, of a polymerization initiator, such as, water, primary alcohols, or primary mercaptans at a temperature of about 120° C. to about 200° C., until at least about 90 percent by weight of the monomer or monomers has been polymerized.

Pressure is not critical and although atmospheric pressures are preferred for reasons of economy, subatmospheric as well as superatmospheric pressures can be used if desired.

As in the case of most polymerizations of organic monomers, it is preferred to carry out the polymerization of the above-described lactones under an inert atmosphere although it is not absolutely necessary to do so.

Polymerization time is not narrowly critical but it is preferred to allow the polymerizations to proceed for at least about 1 hour in order to achieve conversions of monomer to polymer of at least about 90 percent by weight.

Although temperatures of about 120° C. to about 200° C. can be used, it is preferred to employ a range of about 150° C. to about 180° C.

The invention is further described in the examples which follow. All parts and percentages are by weight unless otherwise specified.

EXAMPLE 1

In a 1 liter resin kettle purged with nitrogen and equipped with a mechanical stirrer were combined 520 g (4 moles) of E-thiocaprolactone, 1.04 g (0.2 weight percent) of manganous benzoate and 1.48 g, (0.35 mole percent) of diethylene glycol. The mixture was heated to 150° C. for 1 hour and then 6 hours at 180° C. After this time, 98 percent conversion to poly($\epsilon$-thiocaprolactone) was achieved having a reduced viscosity (chloroform, 30° C., 0.2g/100 ml) of 0.62. The colorless polymer had the following mechanical properties: Tensile Modulus (psi) 55,050; Tensile Strength (psi) 3,050 and Elongation at Break 720 percent. The excellent thermal stability of this poly($\epsilon$-thiocaprolactone) was demonstrated by heating a sample for 12 hours at 180° C. under nitrogen. No degradation occurred as evidenced by the absence of color development or a reduction in the reduced viscosity.

EXAMPLE 2

Using the procedure described in (1), 0.868 g (0.35 mole percent) of ethylene glycol was substituted for the diethylene glycol. A poly($\epsilon$-thiocaprolactone) having a reduced viscosity of 0.65 was obtained.

EXAMPLE 3

In a 250 ml round bottom flask flushed with nitrogen and equipped with mechanical stirrer and a thermometer were combined 100 g. (0.78 moles) of $\epsilon$-thiocaprolactone, 0.030 ml. (0.21 mole percent) of water and 0.2 g. 0.2 weight percent of manganous benzoate. After 1 hour at 150° C. and 4 hours at 180° C., the poly ($\epsilon$-thiocaprolactone) was discharged. A conversion of 92 percent monomer to polymer having a reduced viscosity of 0.90 was achieved.

EXAMPLE 4

Example 3 was repeated with 0.12 g. (0.21 mole percent) of n-butanol being substituted for the water. A poly ($\epsilon$-thiocaprolactone) having a reduced viscosity of 0.80 was obtained.

EXAMPLE 5

In a 250 ml round bottom flask purged with nitrogen and equipped with a mechanical stirrer and thermometer were combined 83.9 g (0.64 moles) of ($\epsilon$-thiocaprolactone), 9.6 g (14 mole percent) of diethylene glycol and 0.083 g (0.1 weight percent) of manganous benzoate. After 1 hour at 150° C., the temperature was maintained at 180° C. for 4 hours. End group analysis of the poly ($\epsilon$-thiocaprolactone) obtained indicated a molecular weight of 1,220.

EXAMPLE 6

Example 5 was repeated using 1.92 g. (2.5 mole percent) of 1,1,1-tris-(hydroxymethyl)-ethane in place of the diethylene glycol. End group analysis of the poly ($\epsilon$-thiocaprolactone) obtained at a conversion of 97 percent showed a molecular weight of 5,860.

CONTROL A

To a nitrogen filled 50 ml flask was added 11.4 g. (0.1 mols; distilled over toluene diisocyanate) of $\epsilon$-caprolactone, 0.028 g (0.25 weight percent) of diethylene glycol and 0.023 g (0.2 weight percent) of manganous benzoate. After 6 hours at 180° C. a low molecular weight, colored polymer was isolated in low yield (35 percent).

EXAMPLE 7

To a nitrogen filled 3-necked round bottom flask equipped with a magnetic stirrer and thermometer was charged 35.34 g. (0.31 mols; distilled over toluene diisocyanate) of ε-caprolactone, 11.70g. (0.09 mols; distilled over toluene diisocyanate) of ε-thiocaprolactone, 0.12 g. (0.25 weight percent based on the total weight of ε-caprolactone and ε-thiocaprolactone) of diethylene glycol and 0.094 (0.2 weight percent based on the total weight of ε -caprolactone and ε -thiocaprolactone) of manganous benzoate. The contents of the flask were heated to 150° C. and maintained at this temperature for 1 hour. The temperature was then raised to 180° C. and maintained there for 5 hours. There was thus obtained a copolymer of ε-caprolactone and ε-thiocaprolactone which was devolatilized of unreacted monomers under vacuum. The yield of copolymer was 45.75 g. (97 percent based on the monomers charged). The reduced viscosity of the copolymer when measured at 30° C. as a 0.2 percent solution in chloroform was 0.70.

EXAMPLE 8

A 1-liter resin kettle equipped with a mechanical stirrer and thermometer is purged with nitrogen and then charged with 135 g. (1.3moles) of styrene, 3.0 g. (0.0234 mols) of β-hydroxyethyl methacrylate, 462 g. (3.61 mols) of ε-thiocaprolactone and 0.7 g. of dicumyl peroxide. The mixture is heated at 150° C. for 4 hours and then 0.50 g. of manganous benzoate added after which heating is continued for an additional 4 hours at 180°–200° C. A graft copolymer consisting of poly (ε-thiocaprolactone) side chains grafted onto a styrene/ β-hydroxyethyl methacrylate copolymer backbone can be recovered.

EXAMPLE 9

A 1-liter resin kettle equipped with a mechanical stirrer and thermometer is purged with nitrogen and charged with 270 g. of Carbowax 6,000 (tradename of Union Carbide Corporation for an ethylene oxide polymer having a molecular weight of 6,000) dissolved in 330 g. (2.58 mols) of ε-thiocaprolactone. There is then added 0.4 g. of manganous benzoate whereupon the mixture is heated at 180° C. for 5 hours. A copolymer of Carbowax 6,000 and ε-thiocaprolactone can be recovered.

Although the invention has been described in its preferred forms with a certain degree of particularity, it is understood that the present disclosure has been made only by way of example and that numerous changes may be resorted to without departing from the spirit and the scope of the invention.

I claim

1. Catalyst for the polymerization of thiolactones having about 5 to about 8 carbon atoms therein which consists essentially of a manganous or cadmium carboxylic acid salt having from 1 to about 18 carbon atoms, in combination with at least about 0.1 mole percent, based on the moles of thiolactone, of a polymerization initiator selected from the group consisting of water, primary alcohols, and primary mercaptans.

2. Catalyst claimed in claim 1 wherein the salt is manganous benzoate.

3. Catalyst claimed in claim 1 wherein the salt is cadmium caprylate.

4. Catalyst claimed in claim 1 wherein the initiator is a primary alcohol.

5. Catalyst claimed in claim 4 wherein the primary alcohol is ethylene glycol.

6. Catalyst claimed in claim 4 wherein the primary alcohol is diethylene glycol.

7. Catalyst claimed in claim 1 wherein the initiator is water.

8. Catalyst claimed in claim 1 wherein the initiator is a primary mercaptan.

9. Method of polymerizing lactones which comprises contacting a thiolactone monomer having the formula:

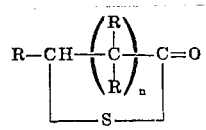

wherein $n$ is an integer having values of from about 3 to about 6, wherein at least $n + $ two R's are hydrogen and wherein the remaining R's are lower alkyl groups having up to about 8 carbon atoms, and 0 to about 99 weight percent, based on the weight of thiolactone monomer of a lactone monomer having the formula:

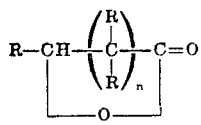

wherein $n$ and R are as defined above with a catalytic amount of a manganous or cadmium salt of a carboxylic acid having 1 to about 18 carbon atoms sufficiently soluble in the above monomers in combination with at least about 0.1 mole percent, based on the moles of monomers contacted, of a polymerization initiator selected from the group consisting of water, primary alcohols or primary mercaptans at a temperature of about 120° C. to about 200° C. until at least about 90 percent by weight of monomer has been polymerized.

10. Method claimed in claim 9 wherein the carboxylic acid salt is manganous benzoate.

11. Method claimed in claim 9 wherein the carboxylic acid salt is cadmium caprylate.

12. Method claimed in claim 9 wherein the initiator is a primary alcohol.

13. Method claimed in claim 12 wherein the primary alcohol is ethylene glycol.

14. Method claimed in claim 12 wherein the primary alcohol is diethylene glycol.

15. Method claimed in claim 9 wherein the initiator is water.

16. Method claimed in claim 9 wherein the initiator is a primary mercaptan.

17. Method claimed in claim 9 wherein the polymerization temperature is about 160° to about 180° C.

18. Method claimed in claim 9 wherein the carboxylic acid salt concentration is about 0.0 to about 1 weight percent based upon the total monomer weight.

* * * * *

UNITED STATES PATENT OFFICE
CERTIFICATE OF CORRECTION

Patent No. 3,755,268     Issue Date August 28, 1973

Inventor(s) PETER E. FRITZE

It is certified that error appears in the above-identified patent and that said Letters Patent are hereby corrected as shown below:

Claim 18, line 2 should read --acid salt concentration is about 0.01 to about 1.--.

Signed and sealed this 20th day of November 1973.

SEAL)
Attest:

EDWARD M. FLETCHER, JR.
Attesting Officer

RENE D. TEGTMEYER
Acting Commissioner of Patents at 212:4.72